I. S. KARRAZ AND L. H. BRIDWELL.
CHEESE CUTTER.
APPLICATION FILED MAY 10, 1920.
1,366,808.
Patented Jan. 25, 1921.
2 SHEETS—SHEET 2.
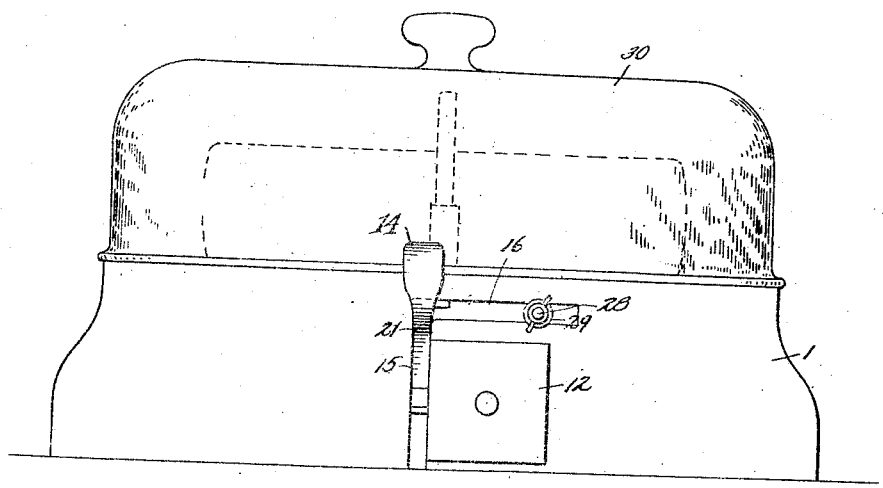
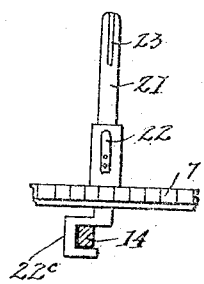
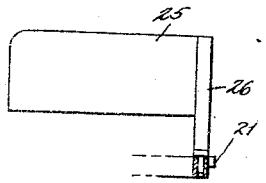
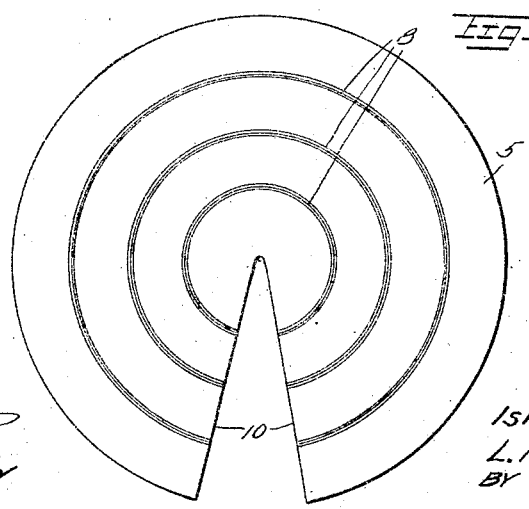
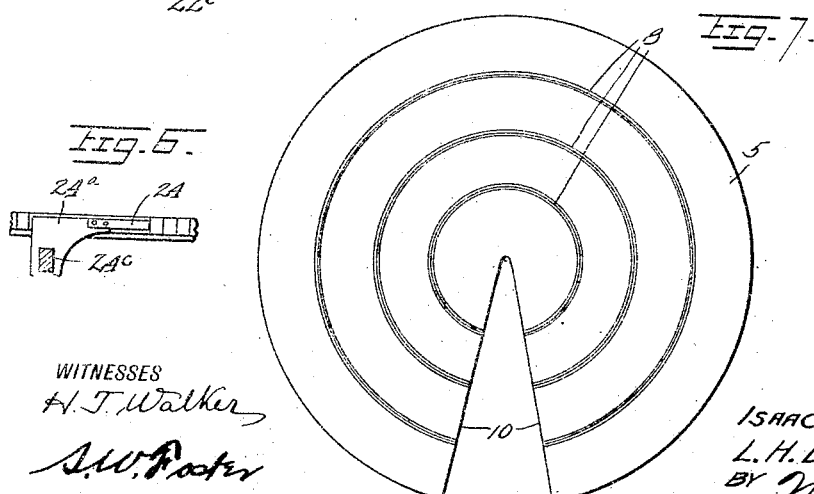
WITNESSES
H. T. Walker
A. W. Foster
INVENTOR
ISAAC S. KARRAZ
L. H. BRIDWELL
BY
ATTORNEYS

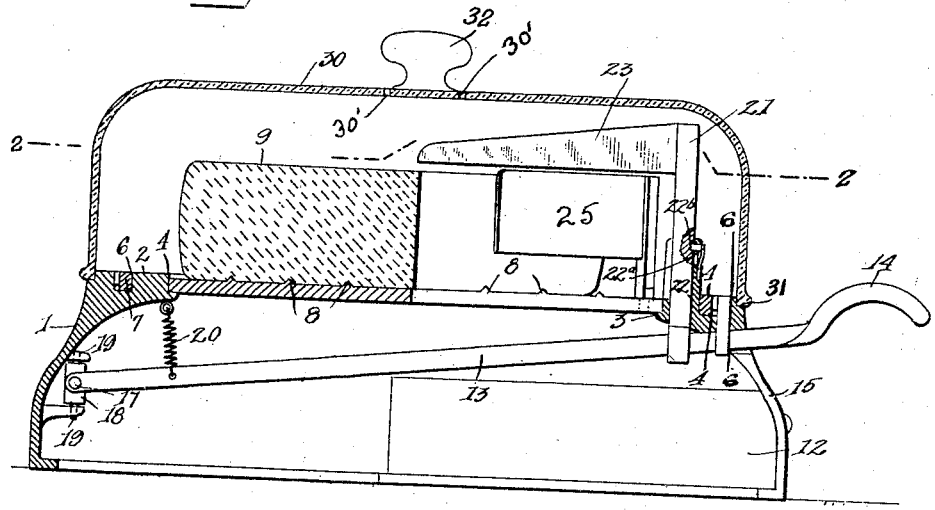

UNITED STATES PATENT OFFICE.

ISAAC S. KARRAZ AND LOUIS H. BRIDWELL, OF DUMAS, ARKANSAS.

CHEESE-CUTTER.

1,366,808.  Specification of Letters Patent.  Patented Jan. 25, 1921.

Application filed May 10, 1920. Serial No. 380,174.

*To all whom it may concern:*

Be it known that we, ISAAC S. KARRAZ and LOUIS H. BRIDWELL, citizens, respectively, of Syria and the United States, and residents of Dumas, in the county of Desha and State of Arkansas, have invented new and Improved Cheese-Cutters, of which the following is a full, clear, and exact description.

This invention relates to improvements in cheese cutters, an object of the invention being to provide a clean and sanitary device supporting the cheese in an inclosed receptacle and provide improved means for cutting the cheese in slices as may be desired.

A further object is to provide a device of the character stated which will be neat, attractive and ornamental in appearance, and which can be easily and conveniently operated to cut the cheese.

With these and other objects in view the invention consists in certain novel features of construction, and combinations and arrangements of parts as will be more fully hereinafter described and pointed out in the claims.

In the accompanying drawings—

Figure 1 is a view in vertical section of our improved device, the section being taken on the line 1—1 of Fig. 2.

Fig. 2 is a sectional plan view on the line 2—2 of Fig. 1.

Fig. 3 is a view in front elevation.

Fig. 4 is a fragmentary view in horizontal section on the line 4—4 of Fig. 1.

Fig. 5 is a fragmentary view mainly in elevation, but partly in section illustrating our improved follower.

Fig. 6 is a fragmentary view in section on the line 6—6 of Fig. 1.

Fig. 7 is a plan view of the cheese supporting table.

1 represents a circular hollow base having a top 2, the latter made with a relatively large central opening 3 and formed around said opening with an annular groove 4 receiving the edge of a cheese supporting table 5, the latter held against rotary movement.

The top 2 is made in its upper face with a circular groove 6 spaced from the edge of the table 5 and in said groove a circular rack 7 is provided, said rack having its teeth on the outer periphery thereof. The table 5 is provided on its upper face with a series of circular concentric sharp webs 8 and the cake of cheese 9, which is of the ordinary circular type, is pressed downwardly onto the table 5 to press the webs 8 into the bottom of the cheese and hold the latter against lateral displacement, but permit rotary movement of the cheese on the table.

The table 5 is provided with a V-shaped recess 10 widest at its outer end and having its apex located at the center of the table 5 and through this recess 10, the pieces of cheese after they are cut, as indicated at 11, fall and pass through the opening 3 of the base top 2 and are caught by a sliding drawer 12 which is movable through the base to permit the removal of the cut piece of cheese.

A lever 13 is mounted in the hollow base 1 and is capable of vertical and lateral movement at its free end, said free end constituting a handle 14 which is movable in a vertical slot 15 in the front of base 1 and is also laterally movable in a horizontal slot 16 in the base communicating with the upper end of the slot 15. The inner end of the lever 13 is pivotally connected, as shown at 17, to a vertically positioned arbor 18, the latter having rotary mounting in bearings 19 in the base 1 so as to permit the vertical and the lateral movement of the lever, as above explained. A coiled spring 20 connects the lever with the upper portion of the base 1 and exerts a lifting action on the lever normally holding the latter in elevated position.

A vertically movable arm 21 is movably mounted in a guide sleeve 22 in the base top 2. This vertically movable arm 21 is normally held in its elevated position by means of a spring pressed friction pin $22^a$ in a relatively shallow notch $22^b$ in the arm 21 so that the arm can be readily moved into and out of holding contact with the pin, but when in elevated position will be operatively held thereby. A cheese cutting blade 23 projects at right angles to the upper end of the arm 21 and is adapted, when moved vertically, to cut the cheese, as will be hereinafter explained.

The arm 21 at its lower end is provided with an angular hook-shaped portion $22^c$ adapted to receive the lever 13 but permit the lever to ride out of engagement therewith when moved laterally. A spring pawl 24 operatively engages the teeth of rack 7 and is carried by a block $24^a$ which is movable in a recess $24^b$ in the top 2 of base 1.

The pawl 24 is of sufficient strength to maintain the block 24ᵃ frictionally held against the wall of the recess 24ᵇ, and the lever 13 is adapted to engage in a recess 24ᶜ in the block 24ᵃ when the lever is in its highest position, so that the lateral swinging movement of the lever through the slot 16 will cause a movement of the pawl 24, but during the vertical movement of the lever, the latter will ride out of the recess 24ᶜ, but will enter said recess when the lever is in its highest position.

It will be noted that the teeth of the rack 7 are so shaped that said rack constitutes a ratchet rack allowing the pawl to ride freely in one direction, but move the rack when the pawl is moved in the opposite direction.

25 represents our improved follower which is in the form of a blade having a supporting post 26 at one end which is removably secured in any approved manner to the rack 7. We have illustrated the post as positioned in an opening 27 of the rack, and it is obvious that a number of such openings may be provided or that the post may be secured to the rack in any other convenient manner.

A bolt 28 is projected through the slot 16 and provided with a wing nut 29 so that this bolt and wing nut constitute a stop limiting the lateral movement of the lever and can be adjusted to any position in the slot to regulate such movement.

A transparent cover 30 is positioned on the base 1 with its lower edge in an annular groove 31 in the base top and operates as an inclosure for the cheese, but permits a clear view of the cheese and the cutting operation. A handle 32 is provided on the cover to facilitate its removal when desired.

The operation is as follows: A circular cheese 9 is placed on the table 5 and is held by the webs 8 against lateral movement and guided by said webs in its turning movement. When the cheese is positioned on the table, the cutting blade 23 is in its highest position and is then drawn downwardly to cut a slit in the cheese and then elevated to its former position. The cheese is then manually turned sufficiently to allow the follower 25 to be inserted in the slit formed by the blade 23 and connected to the rack 7 so as to move with the rack. The lever 13 is then again forced downwardly to move the blade 23 through the cheese and cut off a triangular piece, such as shown at 11, which will fall through the opening 10 into the drawer 12.

The upward and downward movement of the lever 13 carries with it the arm 21 and the cutting blade 23 due to the connection indicated clearly in Fig. 4. This vertical movement of the lever is guided in the slot 15 and the lever cannot move laterally until it is in its highest position. This lateral movement is accommodated by the slot 16 and during this lateral movement, the lever rides out of engagement with the arm 21 and carries with it the pawl 24 as indicated clearly in Fig. 6.

It will therefore be noted that the lateral movement of the lever operates the pawl 24 and the vertical movement operates the cutting blade 23, so that by manipulating the lever laterally, the cheese 9 will be turned due to the follower 25 which is carried by the rack 7, and the vertical movement of the lever will operate to cut the cheese into pieces of the desired size.

It will be noted that the spring 20 normally holds the lever 13 in elevated position so that it is ready for quick operation when desired.

To permit a ventilation through the device perforations 30′ are formed in the cover 30 and the air is permitted a circulation through the device entering the slots 15 and 16 and escaping through the perforations 30′.

Various slight changes might be made in the general form and arrangement of parts described without departing from the invention, and hence we do not limit ourselves to the precise details set forth, but consider ourselves at liberty to make such changes and alterations as fairly fall within the spirit and scope of the appended claims.

We claim:

1. A device of the character stated, comprising a base, a cheese supporting table on the base providing rotary mounting for a cake of cheese, said table having a recess therein through which the pieces of cheese fall as they are cut, a vertically movable cutting blade positioned radially of the table, a lever operating the blade and having vertical and lateral movement, and means operated by the lever during its lateral movement to turn the cheese on the table.

2. A device of the character stated, comprising a base, a cheese supporting table on the base providing rotary mounting for a cake of cheese, said table having a recess therein through which the pieces of cheese fall as they are cut, a vertically movable cutting blade positioned radially of the table, a ratchet rack concentric with the table, a follower on the rack adapted to engage the cheese, a lever operating the blade and having vertical and lateral movement, and a rack moving pawl operated by the lever when the lever is in its elevated position.

3. A device of the character stated, comprising a base, a cheese supporting table on the base providing rotary mounting for a cake of cheese, said table having a recess therein through which the pieces of cheese fall as they are cut, a vertically movable cutting blade positioned radially of the table, a ratchet rack concentric with the table, a follower on the rack adapted to engage the cheese, a lever operating the blade and having vertical and lateral movement, a pawl operatively engaging the ratchet rack and moved by the lever when the lever is in elevated position, a spring normally holding the lever in elevated position, and a transparent cover on the base inclosing the cheese.

4. A cheese cutter, comprising a hollow base having a relatively large opening in its top, a circular table supported above said opening, circular concentric webs on the table adapted to be embedded in the bottom of a cheese cake, said table having a V-shaped recess through which the pieces of cheese are adapted to fall, a circular ratchet rack mounted on the base top around the table, a blade follower adapted to engage the cheese and removably secured to the rack, a lever having vertical and lateral movement in the base, said base having a vertical and a lateral slot receiving the outer end of the lever, a spring connecting the lever and the base normally holding the lever in elevated position, a vertical arm movable by the lever, a cutting blade on the upper end of the arm, and a pawl operated by the lever when the lever is in elevated position.

5. A cheese cutter, comprising a hollow base having a relatively large opening in its top, a circular table supported above said opening, circular concentric webs on the table adapted to be embedded in the bottom of a cheese cake, said table having a V-shaped recess through which the pieces of cheese are adapted to fall, a circular ratchet rack mounted on the base top around the table, a blade follower adapted to engage the cheese and removably secured to the rack, a lever having vertical and lateral movement in the base, said base having a vertical and a lateral slot receiving the outer end of the lever, a spring connecting the lever and the base normally holding the lever in elevated position, a vertical arm, a cutting blade on the upper end of the arm, a pawl for moving the rack and operated by the lever when the lever is in elevated position, a sliding drawer in the base located below the recess of the table and adapted to receive the pieces of cheese falling therethrough, and adjustable means limiting the lateral movement of the lever.

6. A cheese cutter, comprising a hollow base having a relatively large opening in its top, a circular table supported above said opening, circular concentric webs on the table adapted to be embedded in the bottom of a cheese cake, said table having a V-shaped recess through which the pieces of cheese are adapted to fall, a circular ratchet rack mounted on the base top around the table, a blade follower adapted to engage the cheese and removably secured to the rack, a lever having vertical and lateral movement in the base, said base having a vertical and a lateral slot receiving the outer end of the lever, a spring connecting the lever and the base normally holding the lever in elevated position, a vertically movable arm, a cutting blade on the upper end of the arm, a pawl operated by the lever when the latter is in elevated position, a transparent cover on the base inclosing the cheese, and means for limiting the lateral movement of the lever.

7. A cheese cutter, comprising a support adapted to provide rotary mounting for a cake of cheese, a follower adapted to engage the cheese, a ratchet rack carrying the follower, a pawl engaging the ratchet rack, a recessed block supporting the pawl, a vertically movable cutter, a vertical arm supporting the cutter and having a recessed or hook-shaped lower end, and a vertically and laterally movable lever, said lever adapted, when moved vertically, to operate the cutter and when moved laterally, to move the pawl, and during the movement of the pawl said lever adapted to ride out of engagement with the arm and during the movement of the arm ride out of engagement with the pawl.

ISAAC S. KARRAZ.
LOUIS H. BRIDWELL.